United States Patent

Beuscher et al.

[15] 3,638,184

[45] Jan. 25, 1972

[54] PROCESSOR FOR $_M$-OUT-OF-$_N$ CODE WORDS

[72] Inventors: Hugh Jacob Beuscher, Winfield, Ill.; Donald Robert Nelson, Madison, Wis.; William Howard Sisson, Villa Park; Wing Noon Toy, Glen Ellyn, both of Ill.

[73] Assignee: Bell Telephone Laboratories, Incorporated, Murray Hill, N.J.

[22] Filed: June 8, 1970

[21] Appl. No.: 44,270

[52] U.S. Cl. .......... 340/146.1

[51] Int. Cl. .......... H03k 13/32

[58] Field of Search .......... 340/146.1; 235/153; 178/23.1

[56] References Cited

UNITED STATES PATENTS

| | | | |
|---|---|---|---|
| 2,973,506 | 2/1961 | Newby | 340/146.1 X |
| 3,051,784 | 8/1962 | Neumann | 340/146.1 X |
| 3,237,157 | 2/1966 | Higby, Jr. | 340/146.1 |
| 3,348,198 | 10/1967 | Winter | 340/146.1 |
| 3,381,270 | 4/1968 | Huffman et al. | 340/146.1 |
| 3,541,507 | 11/1970 | Duke | 340/146.1 |

OTHER PUBLICATIONS

Sellers, Hsiao, Bearnson, Error Detecting Logic for Digital Computers McGraw-Hill, 1968, pp. 48 & 49, 65- 67, and 207- 211

*Primary Examiner*—Charles E. Atkinson
*Attorney*—R. J. Guenther and Kenneth B. Hamlin

[57] ABSTRACT

A conventional decoder of the type that converts an *m*-out-of-*n* representation to activation of only a single one of plural output lines is modified to have powerful self-checking capabilities. The modified decoder is adapted to be included in a control system in which the words stored in a microprogram memory are coded in an *m*-out-of-*n* format. Such a system automatically detects the occurrence of any no-output or multiple-output readout from the memory.

5 Claims, 2 Drawing Figures

INVENTORS H. J. BEUSCHER
D. R. NELSON
W. H. SISSON
W. N. TOY
BY Lucian C. Canepa
ATTORNEY

PATENTED JAN 25 1972 3,638,184

SHEET 2 OF 2

PROCESSORE FOR -OUT-OF- CODE WORDS

This invention relates to the processing of information words that are encoded in an $m$-out-of-$n$ format and more particularly to the decoding of such words by circuitry that exhibits powerful error-detecting capabilities.

BACKGROUND OF THE INVENTION

Decoders are known in the information processing art for converting each different one of a plurality of applied $m$-out-of-$n$ binary code words to activation of a particular associated one of plural output lines. In turn, the output lines are connected to associated equipment included in a processing system for applying control signals thereto to initiate various functions of practical importance. If, in response to an $m$-out-of-$n$ input word, such a decoder activates more than one output line or no output line, a malfunction in the system with possibly serious consequences will result.

Accordingly, efforts have been directed to the task of designing $m$-out-of-$n$ decoders which have the capability to automatically detect any multiple-output or no-output occurrence therein. A concomitant aim of these efforts has been based on the realization that the achievement of a decoder possessing such a capability might make it feasible to develop a self-checking processing system including such decoders as basic component units.

SUMMARY OF THE INVENTION

An object of the present invention is an improved $m$-out-of-$n$ decoding arrangement.

More specifically, an object of this invention is a relatively simple $m$-out-of-$n$ decoding arrangement characterized by powerful error-detecting capabilities.

Another object of the present invention is a self-checking information processing system which utilizes the improved decoding arrangement as a component building block thereof.

Briefly, these and other objects of the present invention are realized in a specific illustrative embodiment thereof in which a code complement generator is connected to the plural output lines of an $m$-out-of-$n$ decoder. In response to activation by the decoder of any one of the output lines, the generator provides the complement of the $m$-out-of-$n$ code word that led to the selection of the activated line. In turn, the complement word and the corresponding $m$-out-of-$n$ word originally applied to the decoder are compared on a digit-by-digit basis. If any so-called unidirectional errors (which will be defined later below) occurred during the decoding process, at least one pair of corresponding digits of the compared words will have the same binary value. Detection of such an identity provides a positive indication of an error occurrence in the decoding arrangement.

The availability of a reliable self-checking decoding arrangement makes it feasible to design a processor in which $m$-out-of-$n$ code formats are employed. In one such illustrative processor made in accordance with the principles of the present invention, $m$-out-of-$n$ code words are stored in a microprogram store and a decoding arrangement of the type described herein is utilized to decode and check information read out of the store.

A feature of the present invention is that the output of an $m$-out-of-$n$ decoder is utilized to drive a code complement generator and that the output of the generator is compared on a digit-by-digit basis with the $m$-out-of-$n$ word applied to the input of the decoder.

Another feature of this invention is that the detection of identical compared digits in such a decoding arrangement is the basis for signaling the occurrence of an error condition in the arrangement.

A further feature of the present invention is that a system is organized to process $m$-out-of-$n$ code words and that an arrangement of the type described herein is utilized to decode and check such words.

BRIEF DESCRIPTION OF THE DRAWING

A complete understanding of the present invention and of the above and other objects, features, variations and advantages thereof may be gained from a consideration of the following detailed description of an illustrative embodiment thereof presented hereinbelow in conjunction with the accompanying drawing, in which.

DETAILED DESCRIPTION

Figure 1:
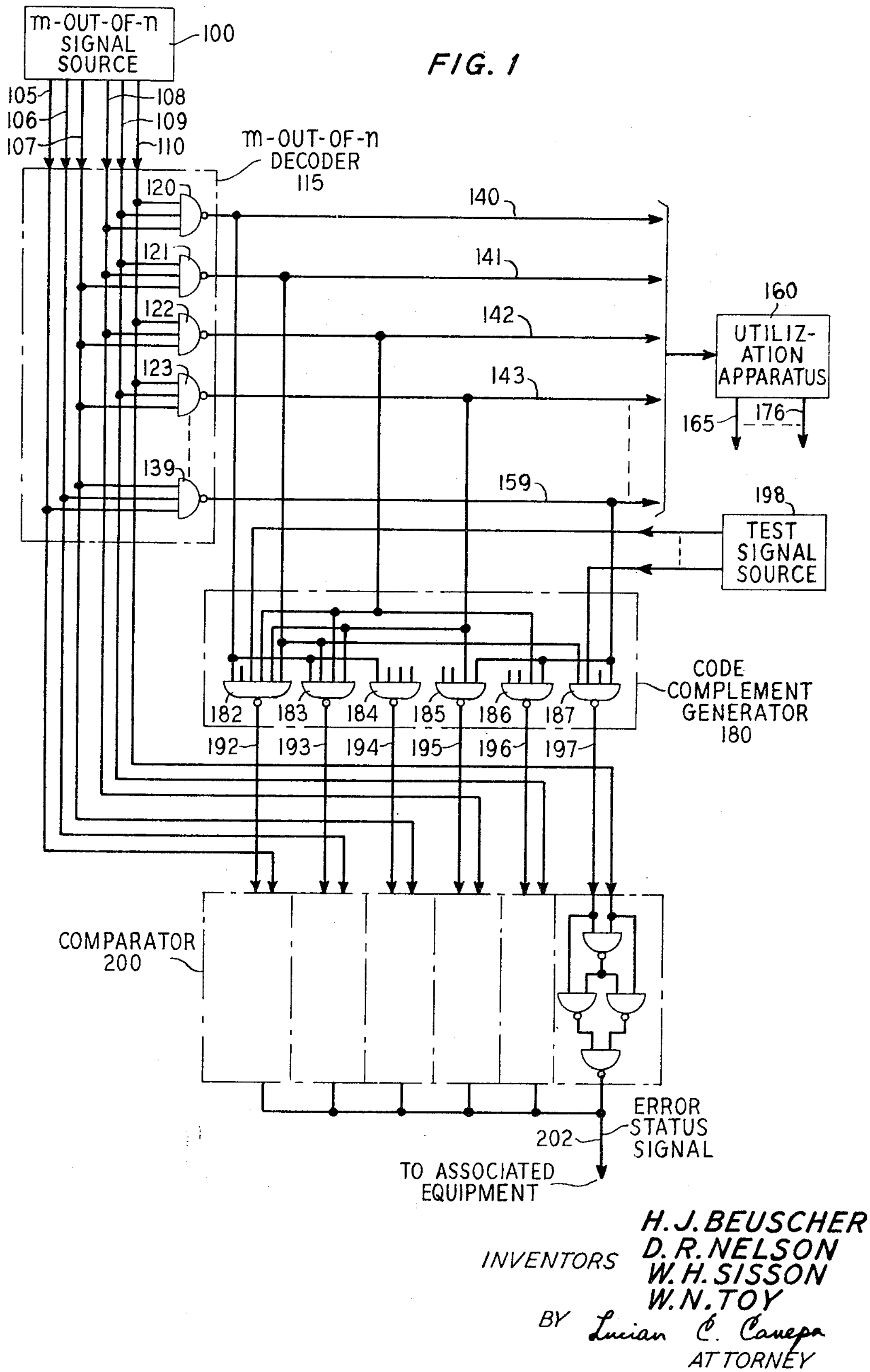
FIG. 1 depicts an $m$-out-of-$n$ decoding arrangement made in accordance with the principles of the present invention.

The decoder arrangement shown in FIG. 1 comprises a source 100 for successively supplying in parallel a plurality of signals representative of $n$-digit binary code words. In accordance with the principles of the present invention, each such word is encoded in an $m$-out-of-$n$ format. It is known that the number of different code combinations realizable in such a format is $n!/m!(n-m)!$. Further, it is known that the maximum number of different combinations is obtained if $m=n/2$. Herein, for illustrative purposes only, it will be assumed that $m=3$ and $n=6$. Accordingly, the source 100 is adapted to generate 20 different 3-out-of-6 code words each of which includes three 1's and three 0's.

Six leads 105 through 110 are shown emanating from the source 100. Signals applied to these leads in a 3-out-of-6 format are applied to an $m$-out-of-$n$ decoder 115 (and also to a comparator 200 which will be described later below). The decoder 115 includes 20 or, more generally, $n!/m!(n-m)!$ conventional NOT-AND (or NAND) gates 120, 121, 122, 123...139 each of whose input terminals are connected to a unique set of three (or, more generally, $m$) of the input leads 105 through 110. Thus, for example, the gate 120 receives inputs from the leads 108 through 110; the gate 121 receives inputs from the leads 107 through 109; the gate 122 receives inputs from the leads 107, 108 and 110; the gate 123 receives inputs from the leads 107, 109 and 110; and the gate 139 receives inputs from the leads 105 through 107. In a straightforward manner (not shown) the other 15 gates are each connected to a unique set of three of the leads 105 through 110. Each of the gates 120, 121, 122, 123...139 included in the decoder of FIG. 1 responds to three 1 signals applied thereto to provide a 0 output signal on its respective output line. Any combination of input signals other than three 1's applied to one of the gates will cause the gate to provide a 1 output signal. Consequently, the application of a 3-out-of-6 code word to the decoder 115 should cause one and only one of the gates 120, 121, 122, 129...139 provide a 0 output signal. In that case each of the other gates should provide a 1 output signal. Hence, it is evident that the decoder 115 serves to convert each applied $m$-out-of-$n$ input word to a 1-out-of-N output representation. Herein, N=20.

Thus, the application of signals representative of the digits 0,0,0,1,1,1 to the leads 105 through 110, respectively, will cause only the gate 120 to provide a 0 signal on its output lead 140. For that particular input word (hereinafter designated 000111) a 1 signal will appear on each of the output leads 141 through 143 and 159 as well as on each of the other 15 output leads (not shown). In turn, the output leads from the gates 120, 121, 122, 123,...139 extend to a utilization apparatus 160. Illustratively, the apparatus 160 includes a standard coordinate matrix array which includes a multiplicity of horizontal input lines and a plurality (for example, 12) of vertical output lines 165...176. The apparatus 160 may, for example, include a transistor cross-point unit positioned at each of preselected ones of the intersections formed by the aforementioned horizontal and vertical lines. Accordingly, energization of (that is, application of a 0 signal to) a particular one of the horizontal input lines is effective to cause a unique 12-digit word to appear in parallel on the vertical output lines. Therefore, the apparatus 160 functions as a converter in which energization of a particular horizontal input line causes a corresponding 12-digit output word to be read out therefrom.

Figure 2:
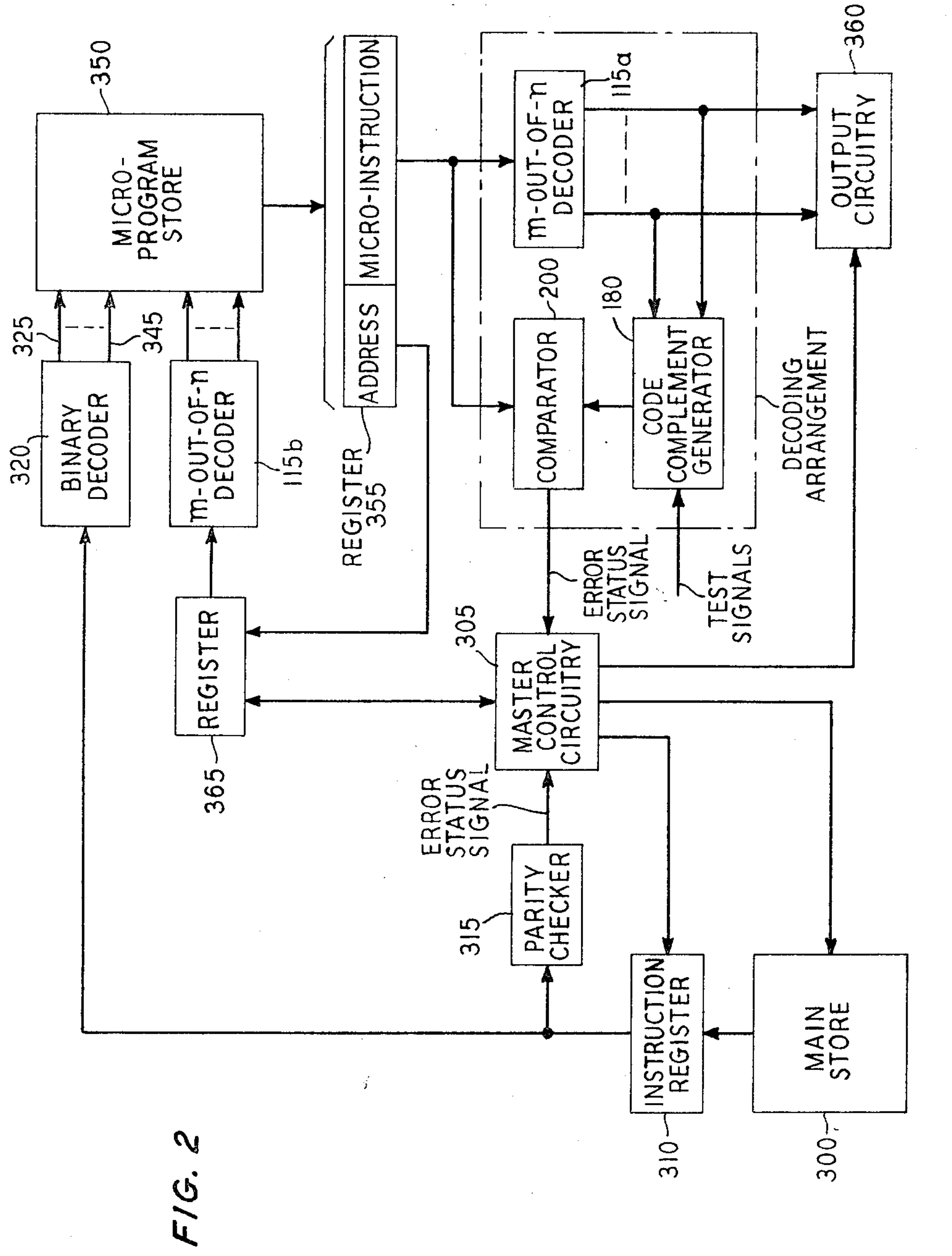
FIG. 2 shows a system including an arrangement of the type illustrated in FIG. 1 for processing $m$-out-of-$n$ code words.

In FIG. 2 (to be described later) the output lines of an *m*-out-of-*n* decoder identical to the unit 115 will be assumed to be connected to a matrix array of the type described above. In FIG. 2 such an array is arranged to serve as a microprogram store or memory unit in a processing system.

The output lines 140, 141, 142, 143...159 shown in FIG. 1 are also connected to a code complement generator 180 which includes an interconnected array of six NAND-gates 182 through 187. In response to activation of any one of the output lines 140, 141, 142, 143...159 of the decoder 115, the generator 180 provides on its output leads 192 through 197 an *n*-digit word whose digits are the respective complements of the word applied to the decoder 115. Thus, for example, activation of the line 140 (in response to the input word 000111) causes a 0 signal to be applied to each of the gates 182 through 184 in the generator 180. All the other input signals applied to the gates 182 through 187 are assumed to be 1's. (Neglect for the moment the nature of the signals applied to the generator 180 by test signal source 198). As a result, the signals appearing on the leads 192 through 197 are 1,1,1,0,0,0, respectively. This word (111000) is seen to be the complement of the input word 000111.

The output of the code complement generator 180 is applied to the comparator 200 wherein a digit-by-digit matching takes place between the word output of the generator 180 and the word output of the source 100. Obviously, if no errors occurred in the decoding process, the corresponding digits of these two words will have respectively different binary forms. Thus, in the illustrative example considered above, the words 000111 and 111000 would be matched in the comparator 200. Since the digits of these words differ in every corresponding position, the comparator 200 would respond thereto by applying a 1 error-status signal to output line 202. This 1 signal is applied to associated equipment (not shown) to signify that the decoding process has been accomplished without error. Illustratively, the line 202 may be connected to a buffer register (not shown) interposed between the output lines 140, 141, 142, 143...159 and the apparatus 160. In that way signals will be transferred fro- the output lines to the apparatus 160 only if no error occurred during the decoding process.

Illustratively, the comparator 200 includes six identical sections each of which receives corresponding digits of the aforementioned two six-digit words. Only one such section is shown in FIG. 1. The depicted section includes four NAND gates interconnected as shown. Inspection of the depicted section reveals that it responds to unlike input signals to provide a 1 output signal and to like input signals to provide a 0 signal. All the output leads emanating from the respective sections of the comparator 200 are tied together and to the lead 202. Accordingly, a 0 signal is applied to the lead 202 if any two corresponding digits of the applied six-digit words are equal.

Many actual fault conditions in logic circuits and read-only memories are of a type that cause one or more of the signals representative of a word to change in one particular direction only. Thus, for example, a circuit failure may change 000111 to 011111 or to 000010 but not to 110011. In other words, such a failure causes at least one 0 to change to a 1 or, alternatively, at east one 1 to change to a 0, but both types of change do not occur together in a single word. The term "unidirectional" is employed herein to designate such a one-way error occurrence.

The decoding arrangement shown in FIG. 1 is capable of instantaneously and automatically detecting any unidirectional error occurrence whether such an error is present in the input word applied to the decoder 115 or arises from a fault in the decoder 115. Specific examples of this self-detecting capability will be described below. The code complement generator 180 and the comparator 200 of FIG. 1 are not completely self-checking. Accordingly, to insure reliable overall operation of the depicted arrangement, it is important that test signals be periodically applied to these units to check their operation. Illustratively, such signals are applied thereto from the source 198. By regularly applying appropriate test patterns of signals to the units 180 and 200, any fault conditions therein can be readily detected.

To illustrate the error-detecting capabilities of the decoder arrangement shown in FIG. 1, assume, for example, that a unidirectional error occurs in the word applied from the source 100 to the decoder 115. In particular, assume that the word 000111 is distorted to 001111. The latter input word causes each of the gates 120 through 123 in the decoder to provide an active or 0 output signal. (Such a multiple-output condition can cause a serious malfunctioning of the apparatus 160.) The application of these multiple-output signals to the code complement generator 180 causes the NAND-gates 182 through 187 to each generate a 1 signal. Under those conditions the output of the generator 180 is the word 111111 (which is the result of ORing the outputs that would be provided by the generator 180 is response to individual activation of the decoder output leads 140 through 143). Subsequently, the comparator 200 matches the word 111111 provided by the generator 180 against the erroneous input word 001111. It is apparent that these words match in four corresponding digit positions. Accordingly, an error-present signal is generated by the comparator and applied to the lead 202, thereby to provide a positive indication that the decoder 115 has functioned in an erroneous manner.

Similarly, faults that occur in the circuitry of the decoder 115 which give rise to multiple outputs will be automatically detected by the arrangement shown in FIG. 1. Any fault condition in the decoder that causes two or more of the decoder output leads 140, 141, 142, 143...159 to be activated will cause the generator 180 to provide a six-digit output word having more than three 1's. Comparison of such an output word with an input word (applied to the leads 105 through 110) having three 1's will, of course, cause the comparator 200 to apply an error-present signal to the lead 202.

Furthermore, any fault condition that causes the decoder 115 to activate none of the output lines 140, 141, 142, 143...159 will also be automatically detected. For example, if an input word is distorted to a form that contains less than three 1's, none of the gates 120, 121, 122, 123...139 in the decoder 115 will provide a 0 output signal. In that case the generator 180 provides an all-0 word which, when compared with the distorted input word, will cause an error-present signal to appear on the lead 202. Similarly, if the input word applied to the decoder 115 is correct but a fault in the decoder causes none of the leads 140, 141, 142, 143...159 to be activated, the comparator 200 will respond to the words applied thereto to furnish an error-present signal to the lead 202.

In summary, the arrangement shown in FIG. 1 is effective to automatically detect the occurrence of a multiple-output or no-output condition on the leads 140, 141, 142, 143...159 emanating from the decoder 115.

The decoding arrangement described above and depicted in FIG. 1 is well suited to be included in a microprogram system adapted to process words encoded in an *m*-out-of-*n* format. Such an illustrative system, characterized by advantageous error-detecting properties, is shown in FIG. 2.

The processor of FIG. 2 includes a main memory or store 300 which contains a number of instructions to be decoded. Each such instruction is effective to initate a so-called microprogram sequence in the depicted apparatus. Illustratively, these instructions are stored in the unit 300 in any conventional binary format (but, illustratively, not in an *m*-out-of-*n* format). Advantageously, each instruction stored therein includes at least one digit determinative of the parity of the remaining digits. In response to a readout signal from standard master control circuitry 305, an instruction to be decoded is applied from the store 300 to an instruction register 310. If the parity of the instruction applied to the register 310 is determined by a parity checker 315 to be correct, the word temporarily stored in the register 310 is transferred, under control of the circuitry 305, to a conventional binary decoder 320. The decoder 320 converts the binary word applied thereto to a 1-out-of-M representation, whereby one of a multiplicity of output lines 325...345 is activated. Illustratively, these output lines constitute some or all of the horizontal lines of a matrix array of the type described above. The overall array constitutes a microprogram memory or store 350 which contains words encoded in an *m*-out-of-*n* format. In particular a 3-out-of-6 format will be assumed herein.

Illustratively, each row of the microprogram store 350 shown in FIG. 2 can be considered to store a plurality of 3-out-of-6 words. For reasons of clarity and simplicity of presentation, however, it will be assumed that only two such words are stored in each row. Hence, the store 350 includes 12 vertical output lines for applying two words at a time to a register 355. By way of example, the left-hand one of each pair of words applied from the store 350 to the register 355 constitutes the address of another row whose words are to be read out of the microprogram store. The right-hand word in the register 355 constitutes a microinstruction which is to be decoded by a unit 115*a* that, for example, is identical to the decoder 115 of FIG. 1.

In the more general case in which more than two *m*-out-of-*n* words are included in each row of the store 350, one of these plural words specifies the address of the next row in the store to be accessed and read out. The other words in a row can be simultaneously decoded and checked by respectively associated plural decoding arrangements, thereby to supply a plurality of signals to associated equipment to control a wide variety of processing functions.

Associated with the decoder 115*a* shown in FIG. 2 are a code complement generator 180 and a comparator 200 which also, by way of illustration, are identical to the corresponding units in FIG. 1. Accordingly, the units 115*a*, 180 and 200 in FIG. 2 comprise a decoding arrangement of the type described above and shown in FIG. 1. This arrangement is adapted to decode and check successive microinstructions stored in the register 355. Any multiple-output or no-output occurrence from the decoder 115*a* is detected by the comparator 200 which signals the circuitry 305 of such an occurrence. In turn, the circuitry 305 applies a signal to output circuitry 360 indicative of whether or not the decoder 115*a* has generated an output representation in the desired 1-out-of-20 format.

As indicated above the left-hand 3-out-of-6 word readout of the store 350 specifies the address therein that contains the next microinstruction to be decoded and checked by the depicted system. This address word is temporarily stored in register 365 and thereafter, under control of the circuitry 305, applied to a 3-out-of-6 decoder 115*b* which also may be identical to the unit 115 depicted in FIG. 1. Activation of one of the output lines of the decoder 115*b* causes two more 3-out-of-6 words to be read out of the store 350 and applied to the indicated sections of the register 355.

Decoding and checking of successive microinstructions applied to the register 355 of FIG. 2 continue until the system signals the end of a microsequence. This may be accomplished, for example, by utilizing a unique code such as an all-0 word for the address portion of the last 12-bit word included in a microsequence. In response to the application of such a unique word to the registers 355 and 365, the circuitry 305 controls the main store 300 to initiate the readout therefrom of another instruction to be decoded. Thereafter another microsequence is read out of the store 350 whereby another set of control signals is applied to the output circuitry 360.

Illustratively, the system shown in FIG. 2 is designed to respond to detection by the master control circuitry 305 of error-present signals generated by the comparator 200 or the parity checker 305 to deactivate the system to permit fault-locating routines to be undertaken. Alternatively, the system can be adapted to respond to an error occurrence encountered during the cycle of operation following readout of a particular instruction from the main store 300 to cause the particular instruction to be reread from the store 300.

Erroneous accessing of the microprogram store 350 shown in FIG. 2, due to multiple outputs or no output from either of the decoders 115*b* and 320, can cause multiple rows or no row in the store 350 to be activated. Also, error occurrences within the store 350 itself can cause a multiple-or no-output condition. In any of these cases the resulting erroneous information read out of the store 350 will be checked and found to be in error by the aforedescribed arrangement including the decoder 115*a*.

Thus, there have been described herein an advantageous self-checking decoding arrangement and an error-detecting processor including at least one such arrangement as an essential component unit thereof. The arrangement and the processor are characterized by a meritorious mode of operation which makes them attractive for use in a variety of applications of practical importance.

It is to be understood that the above-described arrangements are only illustrative of the application of the principles of the present invention. In accordance with these principles, numerous other arrangements may be devised by those skilled in the art without departing from the spirit and scope of the invention.

What is claimed is:

1. In combination, input means for supplying successive input words each encoded in an *m*-out-of-*n* format, where *m* and *n* are positive integers and *m* is less than *n*, a decoder having a plurality of output lines, said decoder being responsive to each one of said input words for activating a respectively associated one of said output lines, and means connected to said output lines and responsive to said input words for detecting the activation of multiple-ones or no-one of said output lines, wherein said means for detecting includes a code complement generator responsive to activation of one of said output lines for generating an *n*-digit word that is the complement of the word that caused the activation of said one line, and a comparator responsive to the word output of said generator and to the word output of said input means for comparing corresponding digits of said words and for providing an error-present signal in the event of an identity between any pair of corresponding digits.

2. A combination as in claim 1 wherein said input means comprises a microprogram store for storing a plurality of words each encoded in an *m*-out-of-*n* format, a register including first and second sections, means for applying words from said store to the respective sections of said register, and means for applying successive ones of the words stored in said second section to said decoder.

3. A combination as in claim 2 further including an *m*-out-of-*n* decoder unit for addressing at least two at a time of the words contained in said store, and means for applying successive ones of the words stored in the first section of said register to said decoder unit.

4. Apparatus for detecting the occurrence of unidirectional errors, said apparatus comprising a decoder for converting an applied *m*-out-of-*n* word to activation of a single-one of plural output lines emanating from the decoder, and checking means connected to said lines and responsive to said applied word for providing an output signal indicative of whether or not a single-one or multiple-ones or no-one of said decoder output lines was activated in response to said applied word, wherein said checking means comprises a code complement unit connected to said output lines for generating an *n*-digit word which is the OR function of the complements of applied words respectively associated with activated lines, and a comparator responsive to the output of said complement unit and to the word applied to the decoder for detecting a match between any pair of corresponding digits thereof and for providing an error-present signal in the event of such a match.

5. Apparatus for converting an $m$-out-of-$n$ input representation to activation of a single-one of plural output lines and for providing an error indication if less than one or more than one output line is activated, said apparatus comprising means including $n$ input lines and $n!/m!(n-m)!$ output lines and responsive to $n!/m!(n-m)!$ different $m$-out-of-$n$ representations appearing on said input lines for activating respectively different ones of said output lines, where $m$ and $n$ are positive integers and $m$ is less than $n$, means responsive to the activation of said output lines for generating the complement of the $m$-out-of-$n$ representation that corresponds to an activated output line, and means responsive to the output of said generating means and to the input representation applied to said activating means for performing a bit-by-bit comparison of said quantities and for supplying an error indication if corresponding bits of said quantities are identical.

* * * * *